US012557182B2

(12) United States Patent
Kasai et al.

(10) Patent No.: US 12,557,182 B2
(45) Date of Patent: Feb. 17, 2026

(54) HEATING DEVICE AND CONTROL METHOD OF LED

(71) Applicant: TOKYO ELECTRON LIMITED, Tokyo (JP)

(72) Inventors: Shigeru Kasai, Yamanashi (JP); Yoshiyuki Morifuji, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 1056 days.

(21) Appl. No.: 17/543,012

(22) Filed: Dec. 6, 2021

(65) Prior Publication Data

US 2022/0191974 A1   Jun. 16, 2022

(30) Foreign Application Priority Data

Dec. 11, 2020   (JP) .................................. 2020-205999

(51) Int. Cl.
*H05B 3/00* (2006.01)
*H05B 45/14* (2020.01)

(52) U.S. Cl.
CPC .......... *H05B 3/0033* (2013.01); *H05B 3/0019* (2013.01); *H05B 45/14* (2020.01)

(58) Field of Classification Search
CPC ...... H05B 3/0047; H05B 45/14; H05B 45/18; G01R 19/30; G01R 19/165
See application file for complete search history.

(56) References Cited

U.S. PATENT DOCUMENTS

| | | | | |
|---|---|---|---|---|
| 2005/0082553 | A1* | 4/2005 | Yamamoto | H05B 45/56 257/83 |
| 2007/0030868 | A1* | 2/2007 | Sekigawa | H01S 5/0683 372/29.015 |
| 2011/0031903 | A1* | 2/2011 | Nguyen Hoang | H05B 45/56 374/178 |
| 2016/0192450 | A1* | 6/2016 | Catalano | H05B 45/56 315/309 |
| 2020/0013645 | A1 | 1/2020 | Gouda | |

FOREIGN PATENT DOCUMENTS

JP   2019-102645 A   6/2019
WO   WO 2010/049882 A2   5/2010

* cited by examiner

*Primary Examiner* — Ibrahime A Abraham
*Assistant Examiner* — Hamzeh Hicham Amin
(74) *Attorney, Agent, or Firm* — Fenwick & West LLP (57) ABSTRACT

A heating device using an LED is provided. The heating device includes a heater for heating a target with LED light, an LED controller for controlling power supplied to the LED such that a temperature of the target is adjusted with the power being in the range where a current thereof does not exceed an allowable current Imax, a correction unit for correcting Imax, and a voltage measurement unit for measuring a voltage of the LED. The correction unit estimates a junction temperature Tjm of the LED when Imax is supplied based on a measurement result by the voltage measurement unit when an estimation current Ie is supplied after Imax is supplied to the LED for correction. When Tjm of the LED when Imax is supplied exceeds Tmax corresponding to Imax, the correction unit corrects Imax.

8 Claims, 8 Drawing Sheets

HEATING DEVICE AND CONTROL METHOD OF LED

CROSS-REFERENCE TO RELATED APPLICATION

This application claims priority to Japanese Patent Application No. 2020-205999 filed on Dec. 11, 2020, the entire contents of which are incorporated herein by reference.

TECHNICAL FIELD

The present disclosure relates to a heating device and a control method of a light-emitting diode (LED).

BACKGROUND

Japanese Patent Application Publication No. 2019-102645 discloses a prober for sequentially testing electrical characteristics of a plurality of test chips, which are provided in a matrix form on a substrate, using a tester. The prober includes a mounting table on which the substrate is mounted, a contactor which sequentially comes into contact with electrode pads of the plurality of test chips, and a plurality of light-emitting diode (LED) units which are provided on a side opposite to a mounting surface of the mounting table so as to independently heat a plurality of regions, in which the plurality of test chips are positioned, respectively, with each LED unit includes one or more LEDs. In addition, the prober includes a controller which outputs a control signal to drive, among the plurality of LED units, at least an LED unit corresponding to a region of a test chip, among the region of the test chip and peripheral regions of the corresponding region.

SUMMARY

A technique according to the present disclosure improves the utilization efficiency of a light-emitting diode (LED) for a long period of time in a heating device which heats a heating target with light emitted from the LED.

One embodiment of the present disclosures is a heating device comprising: a heater which includes an LED and heats a heating target with light emitted from the LED; an LED controller which controls power supplied to the LED and controls, when a temperature of the heating target is adjusted, the power supplied to the LED in a range in which a current thereof does not exceed an allowable current (Imax); a correction unit configured to correct the allowable current (Imax); and a voltage measurement unit configured to measure a voltage of the LED, wherein: the allowable current (Imax) is set in a current range in which light output is linearly changed with respect to a current in a previously acquired current-light output characteristic of the LED; the correction unit estimates a junction temperature (Tjm) of the LED when the allowable current (Imax) is supplied based on a measurement result by the voltage measurement unit when an estimation current (Ie) is supplied after the allowable current (Imax) is supplied to the LED for correction; and when the estimated junction temperature (Tjm) of the LED when the allowable current Imax is supplied exceeds an allowable junction temperature (Tmax) corresponding to the allowable current (Imax), the correction unit corrects the allowable current (Imax).

DETAILED DESCRIPTION

In a semiconductor manufacturing process, a plurality of electronic devices having a predetermined circuit pattern are formed on a substrate such as a semiconductor wafer (hereinafter, referred to as "wafer"). The electrical characteristics and the like of the electronic devices are tested, and the electronic devices are classified into non-defective ones and defective ones. The testing of the electronic device is performed using a test device, for example, in the state of a substrate before each electronic device is divided.

A test system referred to as a prober or the like (hereinafter, referred to as "prober") includes a probe card including a plurality of probes and a mounting table on which a substrate is loaded. During a test, in the prober, each probe of the probe card is in contact with each electrode of an electronic device, and in this state, a tester provided above the probe card supplies an electrical signal to the electronic device through each probe. Based on an electrical signal received by the tester from the electronic device through each probe, whether the electronic device is a non-defective device or a defective device is determined.

In such a type of prober, when the electrical characteristics of the electronic device are tested, a temperature of the mounting table is controlled and a temperature of the substrate is adjusted to a desired temperature by a heating device or a cooling device provided in the mounting table. In addition, in the prober, a heating device which performs heating with light emitted from a light-emitting diode (LED) may be used (see Japanese Patent Application Publication No. 2019-102645).

By the way, in a configuration in which a temperature of the substrate is adjusted to a desired temperature using light emitted from the LED, when a limit value is not set for a current supplied to the LED, a light output may be infinitely increased, and thus, when the temperature of the substrate is lowered from the desired temperature, the temperature may be returned to the desired temperature at high speed, which improves the performance of a prober. However, when the limit value is not set for the current supplied to the LED, a high current is allowed to flow, and thus, a temperature of the LED is increased. Therefore, a temperature of a PN junction of the LED, that is, a junction temperature, may be increased, and the recombination efficiency of electrons and holes in the PN junction may be lowered, which lowers luminous efficiency. In this state, so-called positive feedback is performed, and thermal runaway occurs. That is, it falls into loop of an increase in temperature of the LED→a decrease in luminous efficiency→increasing a current to achieve a high light output→an additional increase in the temperature of the LED.

Therefore, conventionally, a limit value is provided for a current supplied to an LED. However, the limit value is usually constant. In addition, since a current at which thermal runaway occurs differs between the LEDs, the above-described limit value is usually set low. When the above limit values for all LEDs are the same, the LED cannot reach full performance.

On the other hand, even when the current at which thermal runaway occurs does not vary between the LEDs, the current is changed over time. Therefore, when the above limit value is set low and constant in order to maximize the performance of the LED, thermal runaway may occur after a long period of time.

In addition to the prober, the above points are equally applied for a system as long as the system includes a heating device which performs heating with light emitted from an LED.

Therefore, a technique according to the present disclosure maximizes the performance of an LED for a long period of time in a heating device which heats a heating target with light emitted from the LED.

Hereinafter, a mounting table, a heating device, and a control method according to the present embodiment will be described with reference to the accompanying drawings. Meanwhile, in the present specification and the drawings, elements having substantially the same function or structure are designated by like reference numerals, and repeated descriptions thereof will be omitted.

Figure 1:
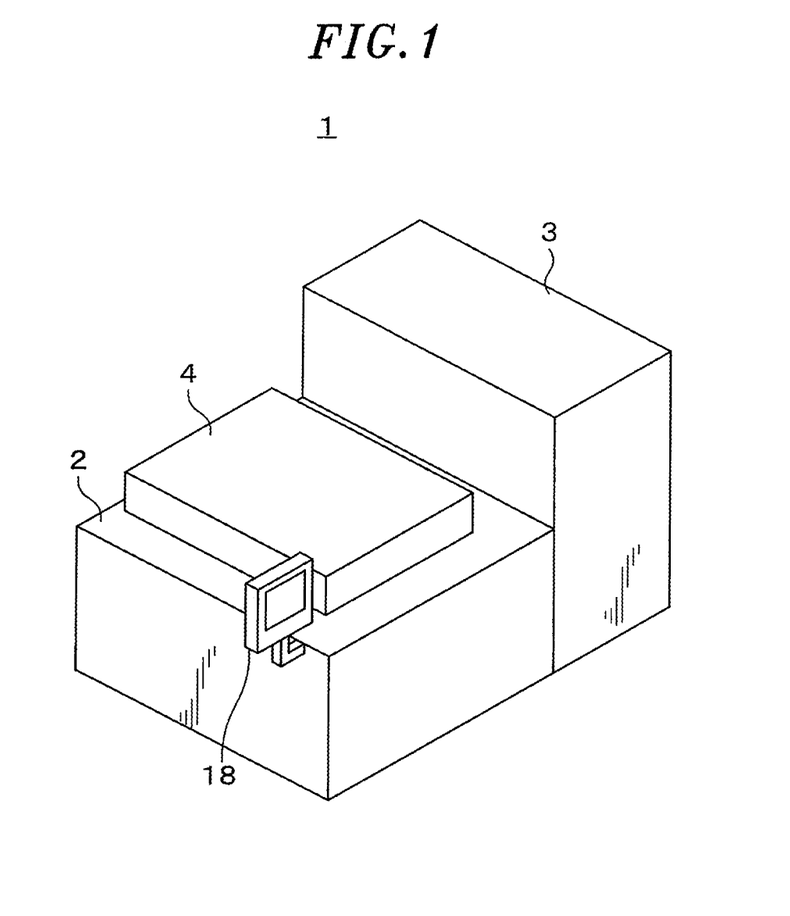
FIG. 1 is a schematic perspective view illustrating a configuration of a prober as a test system including a heating device according to the present embodiment.
Figure 2:
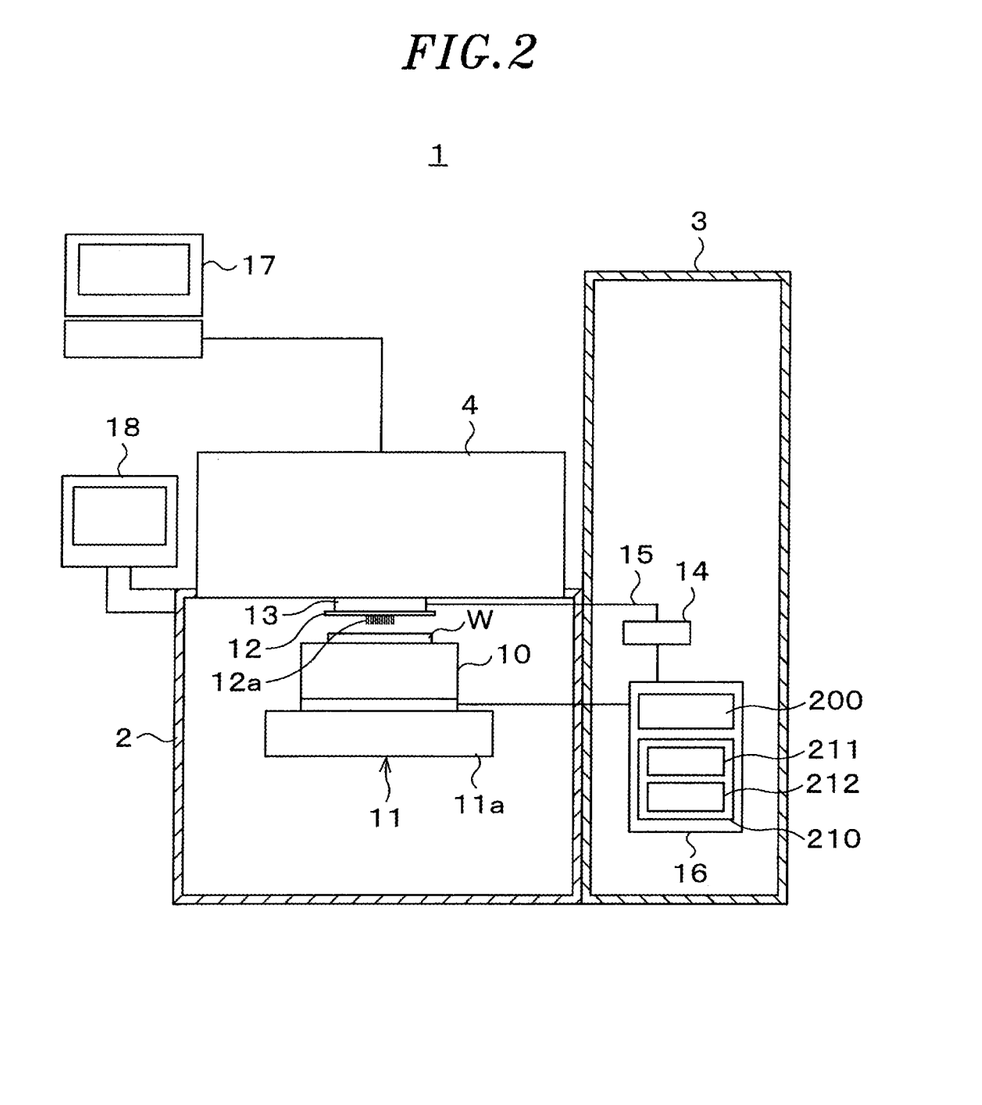
FIG. 2 is a schematic front view illustrating the configuration of the prober as the test system including the heating device according to the present embodiment.

FIGS. 1 and 2 are a schematic perspective view and a schematic front view illustrating a configuration of a prober 1 as a test system including a heating device according to the present embodiment. In FIG. 2, in order to illustrate components built in an accommodation chamber 2 and a loader 3 to be described below, in the prober 1 of FIG. 1, cross sections of parts thereof are illustrated.

The prober 1 of FIGS. 1 and 2 tests the electrical characteristics of a wafer W that is a substrate, a test target, and a heating target. Specifically, the prober 1 tests the electrical characteristics of each of a plurality of electronic devices formed on the wafer W (see reference numeral D of FIG. 3 described below). The prober 1 includes the accommodation chamber 2 for accommodating the wafer W during a test, the loader 3 disposed adjacent to the accommodation chamber 2, and a tester 4 disposed to cover an upper portion of the accommodation chamber 2.

The accommodation chamber 2 is a hollow case and includes a stage 10 on which the wafer W is loaded. The stage 10 adsorbs and holds the wafer W such that a position of the wafer W with respect to the stage 10 is not shifted. In addition, the stage 10 is provided with a moving mechanism 11 for laterally and vertically moving the stage 10. The moving mechanism 11 includes a base 11a, on which the stage 10 is disposed, made of a metal material such as stainless steel, and although not shown, the moving mechanism 11 includes a guide rail, a ball screw, and a motor for moving the base 11a. Through the moving mechanism 11, the relative positions of a probe card 12 to be described below and the wafer W may be adjusted so that a probe 12a of the probe card 12 may be brought into contact with a desired electrode on a surface of the wafer W.

The probe card 12 including a plurality of probes 12a as contact terminals is disposed above the stage 10 so as to face the stage 10 in the accommodation chamber 2. The probe card 12 is connected to the tester 4 through an interface 13. Each probe 12a is in contact with an electrode of each electronic device of the wafer W during a test of electrical characteristics, supplies power from the tester 4 to the electronic device through the interface 13, and transmits a signal from the electronic device to the tester 4 through the interface 13.

A front opening unified pod (FOUP) (not shown), which is a transport container in which the wafer W is accommodated, is disposed on the loader 3. In addition, the loader 3 includes a transfer mechanism (not shown) for transferring the wafer W. The transfer mechanism takes out the wafer W accommodated in the FOUP and transfers the wafer W to the stage 10 of the accommodation chamber 2. Furthermore, the transfer mechanism receives the wafer W, for which a test of the electrical characteristics of the electronic device has been completed, from the stage 10, and accommodates the wafer W in the FOUP.

In addition, the loader 3 includes a potential difference measurement unit 14 for measuring a potential difference in a potential difference generation circuit (not shown) in each electronic device. The potential difference generation circuit is, for example, a diode, a transistor, or a resistor. The potential difference measurement unit 14 is connected to the interface 13 through a wire 15, acquires a potential difference between two probes 12a in contact with two electrodes corresponding to the potential difference generation circuit, and transmits the acquired potential difference to a controller 16 to be described below. The connection structure of each probe 12a and the wire 15 in the interface 13 will be described below.

In addition, the loader 3 includes the controller 16 which performs various types of control such as control of a temperature of the electronic device to be tested, and the controller 16 includes a main controller 200 and a temperature controller 210.

The main controller 200 is composed of, for example, a computer provided with a central processing unit (CPU), a memory, and the like, and the main controller 200 includes a program storage unit (not shown). The program storage unit stores programs that control an operation of each component of the prober 1 (specifically, an operation of the moving mechanism 11 or the like of the stage 10) during a test of electrical characteristics. In addition, the program storage unit stores a program for setting an allowable current Imax of power supplied to LEDs 141 to be described below and a program for correcting the allowable current Imax. Furthermore, the program may be recorded on a computer-readable storage medium and may be installed in the main controller 200 from the storage medium. Some or all of the programs may also be realized as dedicated hardware (circuit board).

The temperature controller 210 includes an LED controller 211 which controls the LED 141 of a light irradiation mechanism 140 to be described below and controls heating by light emitted from the LEDs 141 and a cooling controller 212 which controls a flow rate adjustment valve 162 for adjusting a flow rate of a refrigerant in refrigerant channels R to be described below.

The controller 16 and the potential difference measurement unit 14 may be provided in the accommodation chamber 2, and the potential difference measurement unit 14 may be provided in the probe card 12.

The tester 4 includes a test board (not shown) which reproduces a portion of a circuit configuration of a motherboard on which the electronic device is mounted. The test board is connected to a tester computer 17 which determines whether the electronic device is a non-defective device or a defective device based on a signal from the electronic device. In the tester 4, circuit configurations of a plurality of types of motherboards can be reproduced by replacing the test board.

In addition, the prober 1 includes a user interface unit 18 through which information is displayed only for a user or the user inputs an instruction. The user interface unit 18 includes, for example, an input unit such as a touch panel or a keyboard and a display unit such as a liquid crystal display.

In the prober 1 including the above-described components, when the electrical characteristics of the electronic device are tested, the tester computer 17 transmits data to the test board connected to the electronic device through each probe 12a. The tester computer 17 determines whether the transmitted data has been correctly processed by the test board based on an electrical signal from the test board.

Figure 3:
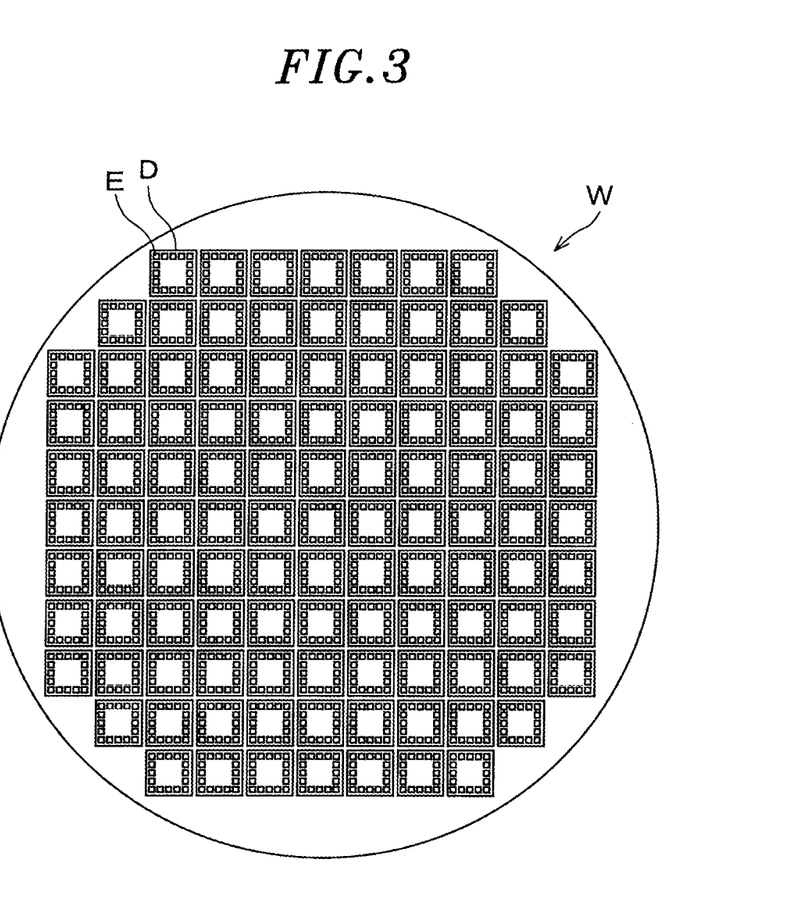
FIG. 3 is a schematic plan view illustrating a configuration of a wafer.

Next, the wafer W to be tested by the prober 1 will be described with reference to FIG. 3. FIG. 3 is a schematic plan view illustrating a configuration of the wafer W.

As shown in FIG. 3, a plurality of electronic devices D are formed on the surface of the wafer W at predetermined intervals by performing an etching process or an interconnection process on a substantially disk-shaped silicon substrate. Electrodes E are formed on a surface of the electronic device D, that is, the wafer W. The electrode E is electrically connected to a circuit element inside the electronic device D. By applying a voltage to the electrode E, a current may flow in the circuit element inside each electronic device D. The electronic device D has, for example, a size of 10 mm$^2$ to 30 mm$^2$ in a plan view.

Figure 4:
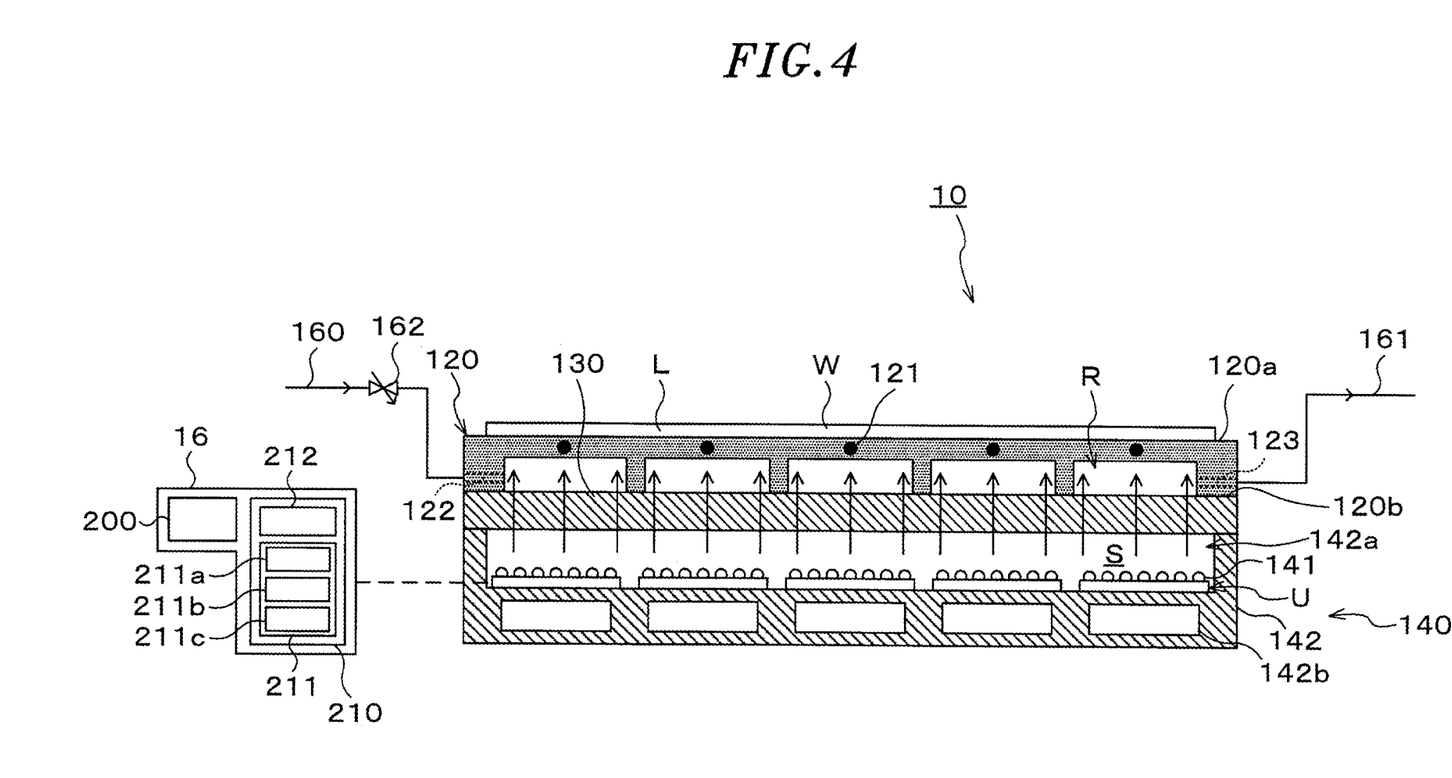
FIG. 4 is a schematic view illustrating configurations of a stage and a light-emitting diode (LED) controller.
Figure 5:
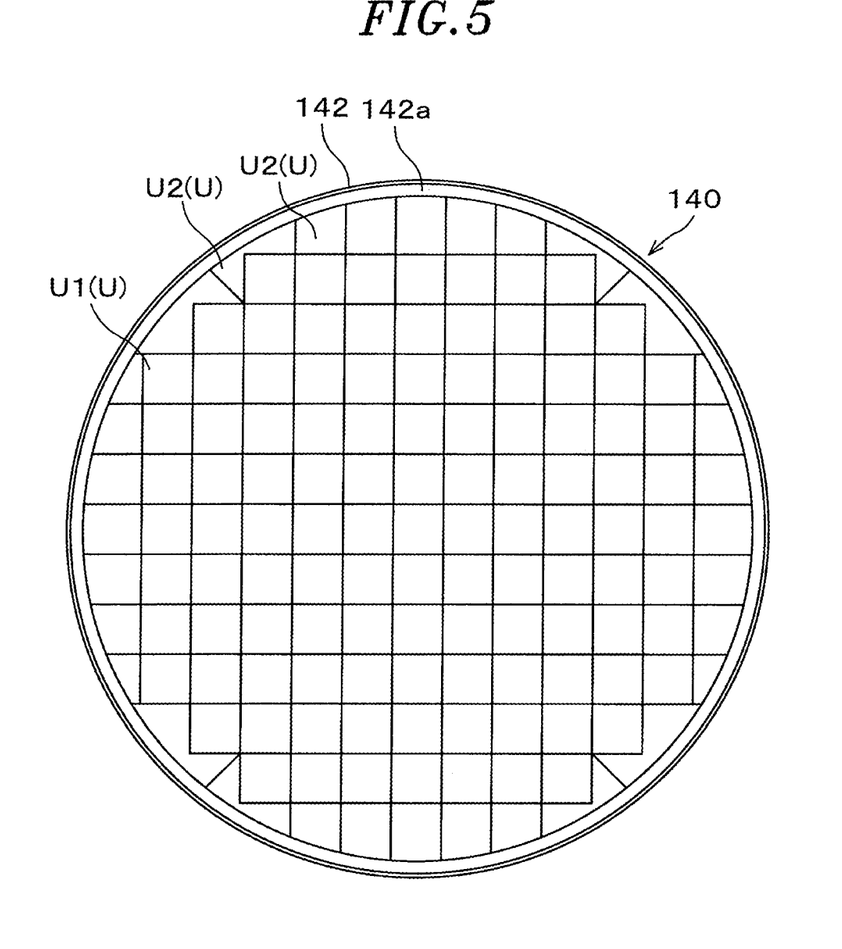
FIG. 5 is a schematic plan view illustrating a configuration of a light irradiation mechanism.
Figure 6:
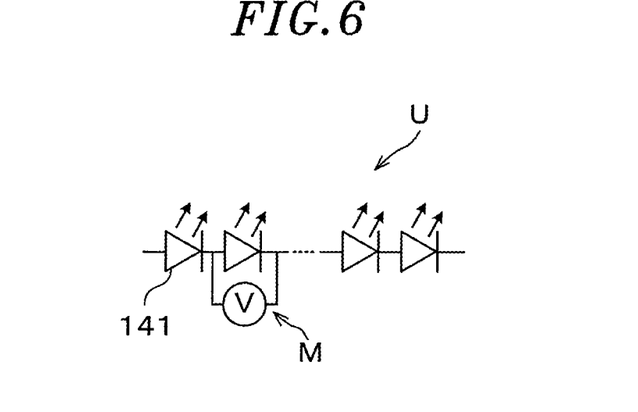
FIG. 6 is a view illustrating an example of a connection of an LED in an LED unit.
Figure 7:
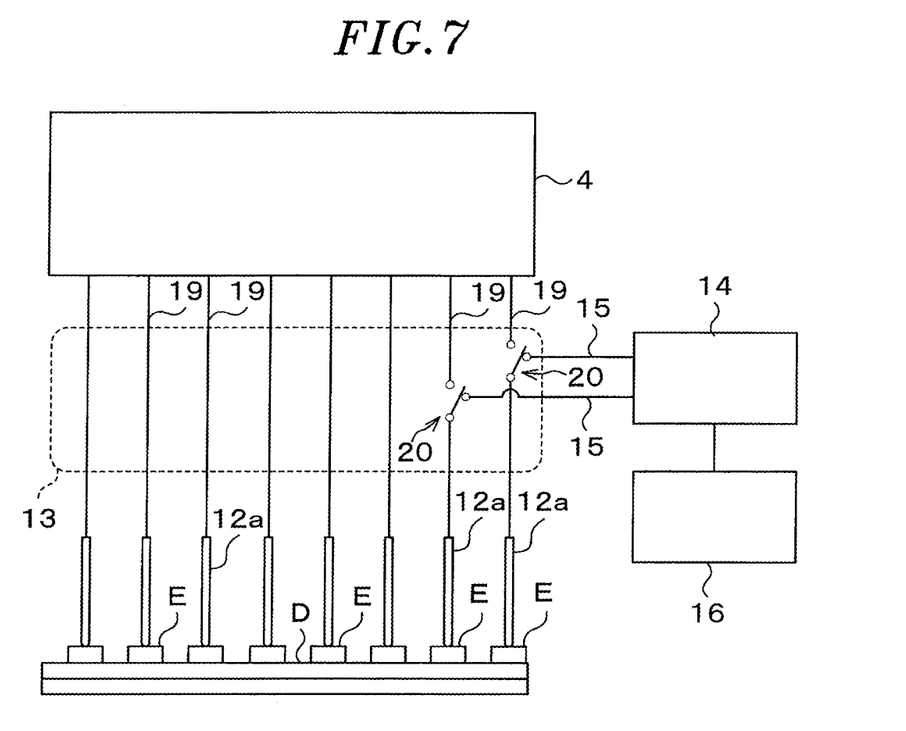
FIG. 7 is a schematic view illustrating a configuration of a circuit for measuring a temperature of an electronic device in the prober of FIG. 1.

Next, configurations of the stage 10 and the LED controller 211 will be described with reference to FIGS. 4 to 6. FIG. 4 is a schematic view illustrating the configurations of the stage 10 and the LED controller 211 and illustrates a cross section of the stage 10. FIG. 5 is a schematic plan view illustrating a configuration of the light irradiation mechanism 140 to be described below. FIG. 6 is a view illustrating an example of a connection of the LEDs 141 in an LED unit U to be described below. FIG. 7 is a schematic view illustrating a configuration of a circuit for measuring a temperature of the electronic device D in the prober 1.

As shown in FIG. 4, the stage 10 is formed by stacking a plurality of functional parts including a top plate 120 as an uppermost plate part. The stage 10 is mounted on the moving mechanism 11 (see FIG. 2) for laterally and vertically moving the stage 10 through a heat insulating member (not shown). The heat insulating member is for thermally insulating the stage 10 from the moving mechanism 11.

The stage 10 includes the top plate 120, a channel-forming member 130, and the light irradiation mechanism 140 as a heating mechanism in order from above.

The top plate 120 is a member on which the wafer W is loaded. In other words, the top plate 120 is a member of which a surface 120a is a wafer loading surface as a substrate loading surface on which the wafer W is loaded. In addition, hereinafter, in some cases, the surface 120a of the top plate 120, which is also an upper surface of the stage 10, will be referred to as the wafer loading surface 120a.

The top plate 120 is formed, for example, in a disk shape. In addition, the top plate 120 is made of, for example, silicon carbide (SiC). SiC has characteristics of low specific heat and high thermal conductivity. Furthermore, SiC has a characteristic of high absorption efficiency of light emitted from the LEDs 141 of the light irradiation mechanism 140. Therefore, when the top plate 120 is made of SiC, the top plate 120 can be efficiently heated with light emitted from the light irradiation mechanism 140 or can be efficiently cooled with a refrigerant flowing in the refrigerant channels R, and thus, the wafer W loaded on the top plate 120 can be efficiently heated or cooled.

Suction holes (not shown) for adsorbing the wafer W are formed in the wafer loading surface 120a of the top plate 120. In addition, a plurality of temperature sensors 121 are embedded in the top plate 120 at positions spaced apart from each other in a plan view.

The channel-forming member 130 is a member which is bonded to a rear surface of the top plate 120 so as to be interposed between the top plate 120 and the light irradiation mechanism 140 and forms the refrigerant channels R in which a refrigerant flows between the light irradiation mechanism 140 and the top plate 120. The channel-forming member 130 is formed in a disk shape having substantially the same diameter as the top plate 120. In addition, as a material of the channel-forming member 130, a material (for example, glass) capable of transmitting light (specifically, light emitted from the LEDs 141 to be described below) is used.

Grooves are formed in a rear surface 120b of the top plate 120 on which the channel-forming member 130 is mounted, and the grooves are covered with the channel-forming member 130 to form the refrigerant channels R. In the prober 1, the top plate 120 is cooled by a refrigerant flowing in the refrigerant channels R, thereby cooling the wafer W loaded on the top plate 120, that is, on the stage 10, and specifically, cooling the electronic device formed on the wafer W.

In addition, a supply port 122 and a discharge port 123 communicating with the refrigerant channel R are formed in the top plate 120. A supply pipe 160 for supplying a refrigerant to the refrigerant channel R is connected to the supply port 122, and a discharge pipe 161 for discharging the refrigerant from the refrigerant channel R is connected to the discharge port 123. The supply pipe 160 is provided with a flow rate adjustment valve 162 which adjusts a flow rate of a refrigerant supplied to the refrigerant channel R, a chiller unit (not shown) which stores a refrigerant and adjusts a temperature of the refrigerant, and a pump (not shown).

As a refrigerant flowing in the refrigerant channel R, a material capable of transmitting light (specifically, light emitted from the LEDs 141 to be described below) is used and is supplied to the refrigerant channel R through the supply pipe 160 by the pump.

In addition, a refrigerant having a temperature corresponding to a test temperature or a target temperature of the electronic device D (see FIG. 3) is supplied to the refrigerant channel R. The temperature of the refrigerant is adjusted by the above-described chiller unit under control of the cooling controller 212 of the temperature controller 210.

An operation of the flow rate adjustment valve 162 or the like for adjusting the flow rate of the refrigerant is controlled by the cooling controller 212 of the temperature controller 210.

The light irradiation mechanism 140 includes the plurality of LEDs 141 as light-emitting elements facing the wafer W and heats the wafer W with light emitted from the LEDs 141. The light irradiation mechanism 140 is disposed to face the wafer W loaded on the wafer loading surface 120a of the top plate 120 through the channel-forming member 130.

Specifically, the light irradiation mechanism 140 includes a plurality of LED units U, in which the plurality of LEDs 141 are unitized, and at the same time, includes a base 142 on which the LED units U are mounted. For example, as shown in FIG. 5, the LED units U in the light irradiation mechanism 140 include planar square-shaped units U1 arranged in the same manner and in the same number as the electronic devices D (see FIG. 3) formed on the wafer W and planar non-square-shaped units U2 covering an outer circumference of the planar square-shaped units U1. The units U1 and the units U2 cover approximately the entire surface of the base 142. As a result, light emitted from the LEDs 141 of the LED units U may be emitted onto the entirety of a portion of the top plate 120, on which the wafer W is loaded, at least.

Each LED 141 emits light (for example, infrared light) toward the wafer W. The light emitted from the LED 141 (hereinafter, in some cases, abbreviated as "LED light") passes through the channel-forming member 130 of the stage 10, which is made of a light-transmitting member. The light passing through the channel-forming member 130 passes through a refrigerant capable of transmitting light, which flows in the refrigerant channel R of the stage 10, and is incident on and absorbed by the top plate 120.

In a plan view, the base 142 is formed in a disk shape having substantially the same diameter as the top plate 120. Furthermore, as shown in FIG. 4, the base 142 has a concave portion 142a formed on a surface thereof, and the LED 141 is mounted in the concave portion 142a. The concave portion 142a may be filled with a material capable of transmitting LED light.

In addition, the base 142 has a cooling water channel 142b, through which cooling water as a refrigerant for cooling the LED 141 flows, in a portion closer to a rear surface of the base 142. The base 142 is made of a metal material such as aluminum (Al).

In the light irradiation mechanism 140, LED light, which is incident on the top plate 120 on which the wafer W is loaded, is controlled in units of the LED unit U. Thus, the light irradiation mechanism 140 can emit the LED light only onto an arbitrary portion on the top plate 120 and can make the intensity of light emitted onto the arbitrary portion different from the intensity of light emitted onto another portion. Therefore, the light irradiation mechanism 140 can locally heat the wafer W loaded on the top plate 120 or may locally change the degree to which the wafer W is heated. The LED light is controlled in units of the LED unit U by the LED controller 211.

In addition, in the light irradiation mechanism 140, the plurality of LEDs 141 are connected in series in each LED unit U as shown in FIG. 6. Furthermore, each LED unit U is provided with a voltage measurement circuit M as a voltage measurement unit for measuring a voltage of the LED 141. The voltage measurement circuit M measures, for example, a voltage of one specific LED 141 in the LED unit U. In the following, among the plurality of LEDs 141 provided in each LED unit U, one specific LED 141 of which a voltage is measured by the voltage measurement circuit M may be referred to as a representative LED 141. A measurement result by the voltage measurement circuit M is output to the main controller 200.

In the prober 1, a temperature of the electronic device D to be tested formed on the wafer W on the stage 10 is controlled to be constant at a target temperature through the heating by light emitted from the light irradiation mechanism 140 and through the heat absorption by a refrigerant flowing in the refrigerant channel R. For this temperature control, the prober 1 measures the temperature of the electronic device D.

In the prober 1, as shown in FIG. 7, the probes 12a are connected to the tester 4 through a plurality of wires 19 disposed at the interface 13. In addition, among the wires 19, a relay 20 is provided in each of the two wires 19 connecting the tester 4 and two probes 12a in contact with two electrodes E of the potential difference generation circuit (for example, a diode) in the electronic device D.

Each relay 20 may be configured to switch between the tester 4 and the potential difference measurement unit 14 to transmit a potential of each electrode E thereto. For example, when the electrical characteristics of the electronic device D are tested, after a voltage is applied when each relay 20 is mounted on each electrode E, each relay 20 transmits the potential of each electrode E to the potential difference measurement unit 14 at a predetermined timing. In the above-described potential difference generation circuit, a potential difference generated when a current flows differs according to temperature. Therefore, the temperature of the electronic device D can be measured in real time during a test based on a potential difference of the potential difference generation circuit of the electronic device D, that is, a potential difference between the two electrodes E (probes 12a) of the potential difference generation circuit. In the prober 1, the potential difference measurement unit 14 acquires the potential difference of the potential difference generation circuit of the electronic device D based on the potential of each electrode E transmitted through each relay 21. In addition, the potential difference measurement unit 14 transmits the acquired potential difference to the controller 16. The main controller 200 or the temperature controller 210 of the controller 16 calculates, i.e., measures, the temperature of the electronic device D based on the transmitted potential difference and the temperature characteristics of the potential difference of the potential difference generation circuit.

A method of measuring the temperature of the electronic device D is not limited to the above-described method, and other methods may be used as long as the temperature of the electronic device D may be measured.

In the prober 1, the top plate 120 is cooled with a refrigerant having a temperature corresponding to a test temperature (or a target temperature) under control of the cooling controller 212. In addition, based on a result of measuring a temperature of the electronic device D, the LED controller 211 controls power (specifically, a current thereof) supplied to the LED 141 and controls the emission intensity of the LED 141 such that the temperature of the electronic device D becomes the test temperature (or the target temperature).

As shown in FIG. 4, the LED controller 211 includes a power supply unit 211a, a current adjustment circuit 211b, and a processing unit 211c.

The power supply unit 211a outputs direct current (DC) power supplied to the LED 141.

The current adjustment circuit 211b adjusts a current of the DC power supplied to each LED 141. The current adjustment circuit 211b, for example, adjusts the current of the DC power supplied to each LED 141 in units of the LED unit U.

The processing unit 211c is composed of, for example, a computer including a CPU, a memory, or the like and includes a program storage unit (not shown). The program storage unit stores programs that control the power supply unit 211a and the current adjustment circuit 211b. The program may be recorded on a computer-readable storage medium and may be installed in the processing unit 211c from the storage medium. Some or all of the programs may also be realized as dedicated hardware (circuit board).

When a temperature of the electronic device D is adjusted during a test of the electrical characteristics of the electronic device D, based on a result of measuring the temperature of the electronic device D, the LED controller 211 controls power supplied to the LED 141 corresponding to the electronic device D within a range, in which a current of the power does not exceed the allowable current Imax, such that the temperature of the electronic device D becomes a target temperature. Specifically, during a test of the electrical characteristics of the electronic device D, based on a result of measuring a temperature of the electronic device D, the processing unit 211c determines a current of DC power supplied to the LED 141 corresponding to the electronic device D in a range, in which the current does not exceed the allowable current Imax, such that the temperature of the electronic device D becomes the target temperature. The current adjustment circuit 211b adjusts a current of DC power, which is supplied to the LED 141 corresponding to the electronic device D to be tested, so as to be become a current determined by the processing unit 211c.

As will be described below, the allowable current Imax is preset based on a light output result when power is actually supplied to the corresponding LED 141. In addition, the allowable current Imax is corrected according to a state of the LED 141. Setting and correcting methods of the allowable current Imax will be described below.

Next, an example of processing the wafer W using the prober 1 will be described.

First, the wafer W is taken out of the FOUP of the loader 3, transferred toward the stage 10, and loaded on the wafer loading surface 120a of the top plate 120. Subsequently, the stage 10 is moved to a predetermined position.

Then, all the LEDs 141 of the light irradiation mechanism 140 are turned on. Light output from the LED 141 and a flow rate of a refrigerant flowing in the refrigerant channel R are adjusted based on information acquired from the temperature sensor 121 of the top plate 120 such that a temperature distribution of the top plate 120 is made uniform at a surface thereof.

Then, the stage 10 is moved, and each probe 12a provided above the stage 10 is brought into contact with the electrode E of the electronic device D to be tested of the wafer W.

In this state, the potential difference measurement unit 14 acquires a potential difference of the above-described potential difference generation circuit in the electronic device D to be tested. Assuming that the temperature of the top plate 120 having the uniform temperature distribution at the surface thereof substantially matches a temperature of the electronic device D to be tested, the potential difference is calibrated, that is, information about temperature characteristics of the potential difference is corrected.

Then, a signal for a test is input to each probe 12a. As a result, a test of the electronic device D is started.

During the test, based on information about a potential difference generated in the potential difference generation circuit of the electronic device D to be tested, the temperature of the electronic device D is measured. As described above, the LED controller 211 controls DC power supplied to the LED 141 corresponding to the electronic device D within a range, in which a current thereof does not exceed the allowable current Imax, such that the temperature of the electronic device D becomes a test temperature or a target temperature. In addition, during the test, a temperature and flow rate of a refrigerant in the refrigerant channel R are maintained constant, for example, at a value corresponding to the test temperature or the target temperature of the electronic device D to be tested.

Then, processes of correcting and testing the potential difference of the above-described potential difference generation circuit are repeatedly performed until the test of all the electronic devices D is completed.

When the test of all the electronic devices D is completed, the wafer W is returned to the FOUP of the loader 3, a next wafer W is transferred to the stage 10, and then, the above-described processes are performed until a test of all the wafers W is completed.

Next, the allowable current Imax of DC power supplied to the LED 141 will be described.

In the present embodiment, the allowable current Imax is preset for each LED 141 and then corrected for each LED 141. Specifically, the allowable current Imax is preset for each LED unit U and then corrected for each LED unit U.

Figure 8:
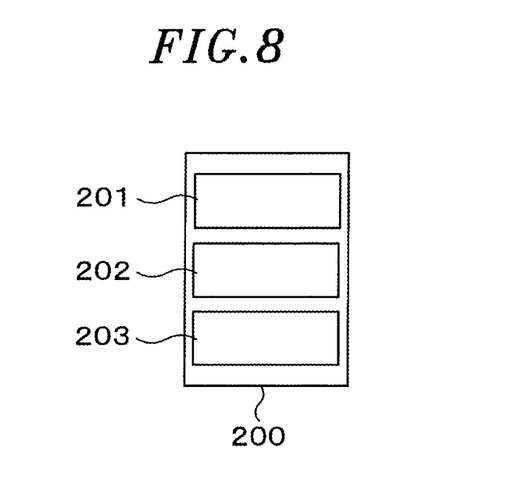
FIG. 8 is a functional block diagram of a main controller (200) relating to the setting and correcting of an allowable current (Imax) of direct current (DC) power supplied to an LED (141).
Figure 9:
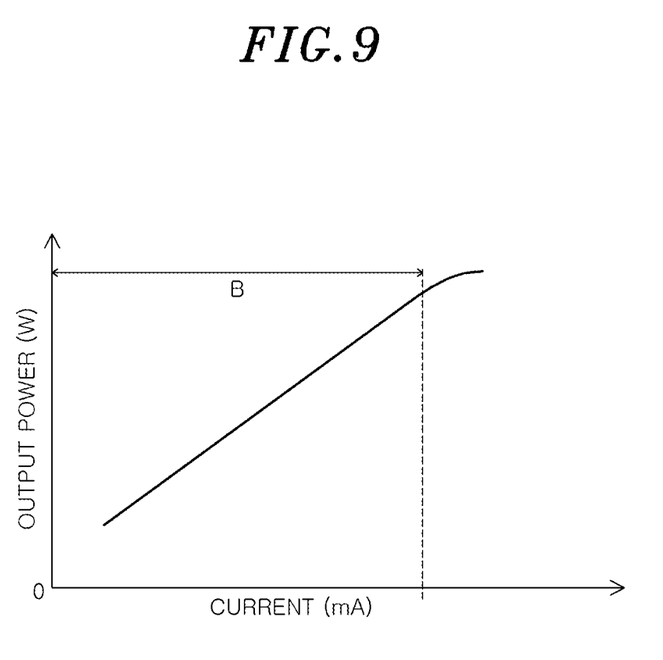
FIG. 9 is a graph showing a relationship between a current of DC power supplied to an LED unit (U) and light output (intensity) of the LED unit (U).

FIG. 8 is a functional block diagram of the main controller 200 relating to the setting and correcting of the allowable current Imax of the DC power supplied to the LED 141. FIG. 9 is a graph showing a relationship between a current of DC power supplied to the LED unit U and light output (intensity) of the LED unit U.

As shown in FIG. 8, the main controller 200 functions as an acquisition unit 201, a setting unit 202, and a correction unit 203 when a processor such as a CPU reads and executes a program stored in the program storage unit.

Upon startup of a device or the like, the acquisition unit 201 supplies DC power to the LED 141 that is a setting target of the allowable current Imax in advance and actually causes the LED 141 to emit light to acquire a current-light output characteristic of the LED 141.

Specifically, the acquisition unit 201 controls the LED controller 211, supplies DC power to the LED unit U that is a setting target of the allowable current Imax, and actually causes the LED unit U to emit light to acquire a current-light output characteristic of the LED unit U as shown in FIG. 9. It is known that the light output of the LED unit U is related to a temperature of a portion of the top plate 120 which is heated by LED light emitted from the LED unit U. Therefore, the acquisition unit 201 calculates and acquires the light output of the LED unit U from a measurement result by the temperature sensor 121 of the corresponding top plate 120 and information on a correlation between a temperature of the top plate 120 and intensity of light output, which is stored in a storage unit (not shown).

Upon startup of the device or the like, the setting unit 202 presets the allowable current Imax for the LED 141 based on the current-light output characteristic, which is acquired by the acquisition unit 201, of the LED 141 that is the setting target of the allowable current Imax. In this case, the setting unit 202 sets the allowable current Imax from a current range in which light output is linearly changed with respect to a current in the acquired current-light output characteristic of the LED 141.

Specifically, the setting unit 202 sets the allowable current Imax for the LED unit U based on the current-light output characteristic, which is acquired by the acquisition unit 201, of the LED unit U that is the setting target of the allowable current Imax. In this case, the setting unit 202 sets the allowable current Imax from a current range B (see FIG. 9) in which light output is linearly changed with respect to a current in the acquired current-light output characteristic of the LED unit U. The setting unit 202 determines, for example, the maximum current included in the current range B as the allowable current Imax.

When, the DC power is in the current range B in which the light output is linearly changed with respect to the current, the LED 141 can be driven efficiently, and even when the DC power is supplied to the LED 141, thermal runaway does not occur in the LED 141.

The correction unit 203 corrects the allowable current Imax for the LED 141, which is a correction target of the allowable current Imax, according to a state of the LED 141.

During the correction, the correction unit 203 supplies the allowable current Imax to the LED 141, which is the correction target, in order to determine the state thereof, and then supplies an estimation current Ie to the LED 141. Furthermore, based on a result of measuring a voltage of the LED 141 at that time, the correction unit 203 estimates a junction temperature Tjm of the LED 141 when the allowable current Imax is supplied.

Here, a method of estimating a junction temperature Tj of the LED 141 will be described.

A current I flowing in the LED 141 is represented by Equation 1 below using a voltage V applied to the LED 141 when DC power with the current I is supplied.

$$I = I_s(e^{qV/nkTj} - 1) \quad (1)$$

$I_s$: reverse saturation current
n: ideal factor
q: elementary electric charge
k: Boltzmann constant When the junction temperature Tj of the LED 141 is not extremely low or high, since $e^{qV/nkTj} \gg 1$, Equation 1 may be approximated as follows.

$$I = I_s \cdot e^{qV/nkTj} \quad (1)'$$

When Equation 1' is transformed and solved for the voltage V of the LED 141, Equation 2 below is obtained.

$$V = (nkTj/q)(\ln I - \ln I_s) \quad (2)$$

A difference Δ (=V1−V2) between the voltage V1 of the LED 141 when the DC power with the current I1 is supplied to the LED 141 and a voltage V2 of the LED 141 when power with a current I2 is supplied to the LED 141 is represented by Equation 3 from Equation 2.

$$\Delta V = (nkTj/q)\ln N \quad (3)$$

N: ratio of current I1 to current I2 (=I1/I2)

Accordingly, the ideal factor n and the junction temperature Tj are represented by Equations 4 and 5 below.

$$N = \Delta Vq/\ln NkTj \quad (4)$$

$$Tj = \Delta Vq/\ln Nkn \quad (5)$$

Thus, upon startup of the device or the like, the correction unit 203 supplies the DC powers with the currents I1 and I2 to the LED 141 at the known junction temperature Tj (for example, room temperature) in advance. Based on results of measuring the voltage V1 of the LED 141 at the current I1 and the voltage V2 of the LED 141 at the current I2, the correction unit 203 calculates the ideal factor n using Equation 4.

During correction, the correction unit 203 supplies the DC power with the allowable current Imax to the LED 141, which is the correction target, in order to determine a state thereof, and then supplies the DC powers with the currents I1 and I2 as the estimation current Ie to the LED 141. Based on the results of measuring the voltage V1 of the LED 141 at the current I1 and the voltage V2 of the LED 141 at the current I2 and the previously calculated ideal factor n, the correction unit 203 uses Equation 5 to calculate, that is, estimate the junction temperature Tjm of the LED 141, which is the correction target, when the DC power with the allowable current Imax is supplied.

The DC power with the allowable current Imax for determining the state is supplied for a predetermined time for which the junction temperature Tj is stabilized (estimated to be stabilized). Meanwhile, the time for which DC power with the estimation current Ie is supplied or DC power for calculating the ideal factor n is supplied is shorter than the above-described predetermined time.

As described above, when the junction temperature Tjm, which is estimated for the LED 141 that is the correction target, when the allowable current Imax is supplied, exceeds an allowable junction temperature Tmax corresponding to the allowable current Imax, the following is estimated. That is, it is estimated that the LED 141 that is the correction target may be degraded such that luminous efficiency is lowered, and when the DC power with the allowable current Imax is supplied to the LED 141, thermal runaway may occur in the LED 141.

Therefore, when the junction temperature Tjm exceeds the allowable junction temperature Tmax, the correction unit 203 corrects the allowable current Imax. For example, for the LED 141 that is the correction target, based on a difference between the estimated junction temperature Tjm and the allowable junction temperature Tmax, the correction unit 203 corrects the allowable current Imax such that the allowable current Imax is decreased.

As described above, the allowable current Imax is corrected specifically for each LED unit U. Therefore, specifically, the correction unit 203 corrects the allowable current Imax for the LED unit U, which is a correction target of the allowable current Imax, according to a state of the LED unit U.

More specifically, the correction unit 203 controls the LED controller 211, supplies the power with the allowable current Imax to the LED unit U, which is the correction target, in order to determine a state thereof, and then supplies the DC power with the estimation current Ie to the LED unit U. In addition, based on a voltage of the representative LED 141 measured by the voltage measurement circuit M of the LED unit U, which is the correction target, at that time, for the LED unit U, the correction unit 203 estimates the junction temperature Tjm of the LED 141 when the allowable current Imax is supplied.

For the estimation, first, upon startup of the device or the like, the correction unit 203 controls the LED controller 211 at a known junction temperature Tj (for example, room temperature) in advance and supplies the DC powers with the currents I1 and I2 to the LED unit U that is the correction target. Based on results of measuring the voltage V1 of the LED 141 at the current I1 and the voltage V2 of the LED 141 at the current I2 in the LED unit U that is the correction target, the correction unit 203 calculates the ideal factor n using Equation 4.

During correction, the correction unit 203 controls the LED controller 211, supplies the DC power with the allowable current Imax to the LED unit U, which is the correction target, in order to determine a state thereof, and then supplies the DC powers with the currents I1 and I2 as the estimation current Ie to the LED unit U141. For the LED unit U that is the correction target, based on results of measuring the voltage V1 of the representative LED 141 at the current I1 and the voltage V2 of the representative LED 141 at the current I2 and the previously calculated ideal factor n, the correction unit 203 calculates the following using Equation 5. That is, the correction unit 203 calculates, that is, estimates the junction temperature Tjm of the LED 141 when the DC power with the allowable current Imax is supplied.

When the junction temperature Tjm, which is estimated for the LED unit U that is the correction target, when the allowable current Imax is supplied, exceeds the allowable junction temperature Tmax corresponding to the allowable current Imax, the correction unit 203 corrects the allowable current Imax. For example, for the LED unit U that is the correction target, based on a difference between the estimated junction temperature Tjm and the allowable junction temperature Tmax, the correction unit 203 corrects the allowable current Imax such that the allowable current Imax is decreased.

Figure 10:
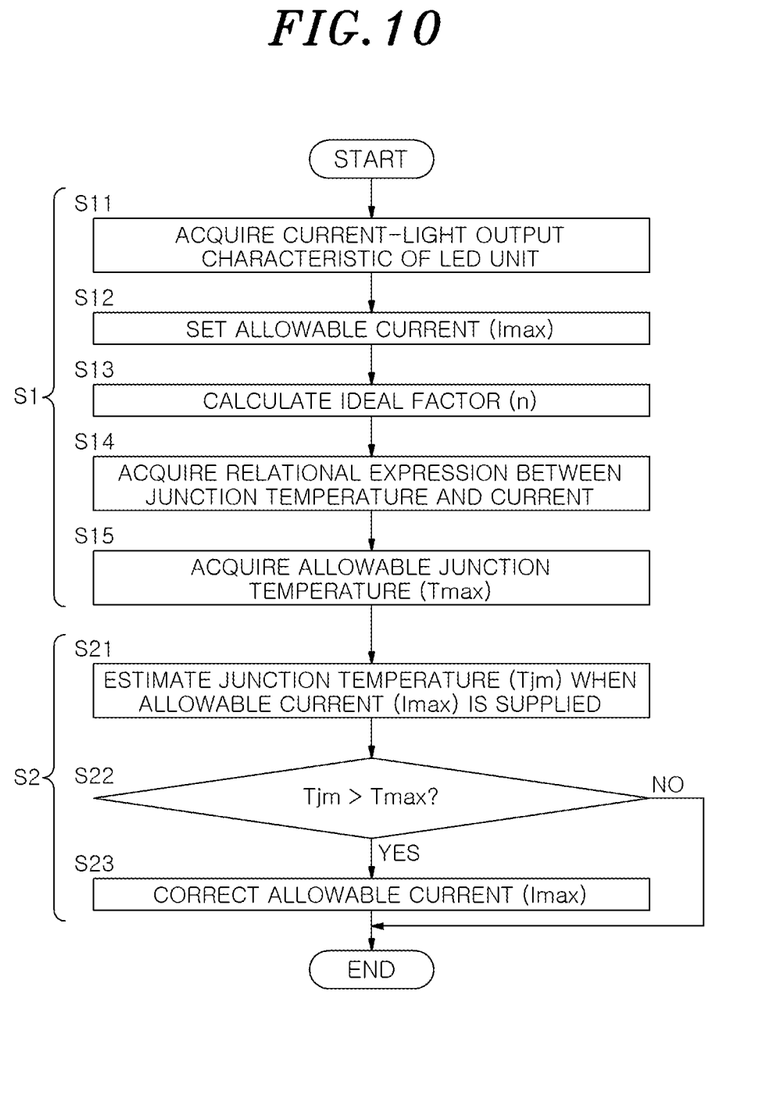
FIG. 10 is a flowchart illustrating one example of the present correcting method.

Next, an example of a correcting method of the allowable current Imax will be described. FIG. 10 is a flowchart illustrating an example of the present correcting method.

As shown in FIG. 10, the present correcting method includes, before a process of correcting an allowable current Imax (operation S2), a preparation process of determining the allowable current Imax (initial value) or the like (operation S1).

In the preparation process performed upon startup of a device or the like, an acquisition unit 201 acquires a current-light output characteristic of each LED unit U (operation S11).

Specifically, the acquisition unit 201 performs the following processes on each LED unit U. That is, the acquisition unit 201 controls an LED controller 211, supplies each of a plurality of DC powers with different currents to each LED unit U, and cause the one LED unit U to emit light for a predetermined time to heat a top plate 120 until a temperature is stabilized. In addition, the acquisition unit 201 acquires a result of measuring a temperature of the top plate 120 by a temperature sensor 121 corresponding to the one LED unit U for each current (value) of the DC power supplied to the one LED unit U. The acquisition unit 201 acquires the current-light output characteristic of the one LED unit U from the result of measuring the temperature of the top plate 120 acquired for each current of the DC power and information on a correlation between a temperature of the top plate 120 and light output, which is stored in a storage unit (not shown).

In addition, in the preparation operation, a setting unit 202 sets the allowable current Imax of an LED 141 for each LED unit U (operation S12).

Specifically, the setting unit 202 performs the following processes on each LED unit U. That is, the setting unit 202 extracts a current range B in which light output is linearly changed with respect to a current in the current-light output characteristic acquired in operation S11 for one LED unit U. The setting unit 202 determines the maximum current included in the current range B as the allowable current Imax (initial value) for the one LED unit U.

In addition, in the preparation process, a correction unit 203 calculates an ideal factor n for each LED unit U for correcting the allowable current Imax (operation S13).

Specifically, the correction unit 203 performs the following processes on each LED unit. That is, the correction unit 203 controls the LED controller 211 and supplies each of DC powers with currents I1 and I2 having two magnitudes to the one LED unit U for a short time in a state in which a junction temperature Tj of a representative LED 141 of the one LED unit U is stabilized at room temperature. The "short time" is a time (for example, several hundred microseconds) for which the junction temperature Tj of the representative LED 141 is not changed due to the supply of DC power. For the one LED unit U, based on results of measuring a voltage V1 of the representative LED 141 at the current I1 and a voltage V2 of the representative LED 141 at the current I2, which are measured in a voltage measurement circuit M, the correction unit 203 calculates the ideal factor n using Equation 4.

In addition, in the preparation process, for each LED unit U, the correction unit 203 acquires a relational equation between a junction temperature and a current in the LED 141 for correcting the allowable current Imax (operation S14).

Specifically, the correction unit 203 performs the following processes on each LED unit. That is, the correction unit 203 controls the LED controller 211 and supplies DC power with an equation acquisition current Ig to one LED unit U for a predetermined time (for example, several seconds) to stabilize the junction temperature Tj of the representative LED 141. Next, the correction unit 203 controls the LED controller 211 and stops the supply of the DC power with the equation acquisition current Ig to the one LED unit U, and then supplies each of the DC powers with the currents I1 and I2 as an estimation current Ie for a short time (for example, several hundred microseconds) before the junction temperature Tj of the representative LED 141 is decreased. For the one LED unit U, based on the results of measuring the voltage V1 of the representative LED 141 at the current I1 and the voltage V2 of the representative LED 141 at the current I2, which are measured in the voltage measurement circuit M, and the ideal factor n calculated in operation S13, the correction unit 203 calculate, using Equation 5, the junction temperature Tj of the representative LED 141 when the equation acquisition current Ig is supplied. By repeating such a process on a plurality of equation acquisition currents Ig selected, for example, between zero and the allowable current Imax determined in operation S2, the correction unit 203 acquires a relational equation between the junction temperature Tj and a current I in the representative LED 141 for one LED unit U. The above relational equation is represented by, for example, Equation 6 below.

$$I = aTj + b \quad (6)$$

a, b: constant

In addition, in the preparation process, for each LED unit U, the correction unit 203 acquires an allowable junction temperature Tmax corresponding to the allowable current Imax of the LED 141 for correcting the allowable current Imax (operation S15).

Specifically, for example, for each LED unit U, based on the allowable current Imax of the LED 141 set in operation S12 and the relational equation between the junction temperature and the current in the representative LED 141 acquired in operation S14, the correction unit 203 acquires the allowable junction temperature Tmax of the representative LED 141. The allowable current Imax may be actually supplied to each LED unit U, and a result of estimating the junction temperature Tj at that time may be used as the allowable junction temperature Tmax.

A correction process of operation S2 is performed, for example, during idling (specifically, during replacement or maintenance of a wafer W). In addition, the correction process of operation S2 may be performed on each electronic device D to be tested or may be performed during a test of the electrical characteristics of one electronic device D.

In the correction process, the correction unit 203 supplies DC power with the allowable current Imax for correction and estimates a junction temperature Tjm of the LED 141 of the LED unit U, which is a correction target, at that time (operation S21).

Specifically, the correction unit 203 controls the LED controller 211, supplies the DC power with the allowable current Imax to the LED unit U, which is the correction target, for a predetermined time (for example, several seconds), and stabilizes the junction temperature Tjm of the representative LED 141. Next, the correction unit 203 controls the LED controller 211, stops the supply of the DC power with the allowable current Imax to the one LED unit U, which is the correction target, and then supplies each of the DC powers with the currents I1 and I2 as the estimation current Ie for a short time (for example, several hundred microseconds) before the junction temperature Tjm of the representative LED 141 is decreased. For the LED unit U that is the correction target, based on the results of measuring the voltage V1 of the representative LED 141 at the current I1 and the voltage V2 of the representative LED 141 at the current I2, which are measured in the voltage measurement circuit M, and the previously calculated ideal factor n, the correction unit 203 uses Equation 5 above to calculate, that is, estimate the junction temperature Tjm of the representative LED 141 when the DC power with the allowable current Imax is supplied.

In addition, in the correction process, the correction unit 203 determines whether the junction temperature Tjm estimated in operation S21 exceeds the allowable junction temperature Tmax acquired in operation S15 (operation S22).

As a determination result, when the junction temperature Tjm does not exceed the allowable junction temperature Tmax (NO), the allowable current Imax is not corrected, and the correction process is ended. When the junction temperature Tjm exceeds the allowable junction temperature Tmax (YES), the correction unit 203 corrects the allowable current Imax for the LED unit U that is the correction target (operation S23). Specifically, the correction unit 203 calculates an allowable current Imaxnew after a correction based on, for example, Equation 7.

$$I\text{ maxnew} = a(T\text{ max} - Tj) + I\text{ maxold} \quad (7)$$

Imaxnew: allowable current after correction
Imaxold: allowable current for correction
a: constant of Equation 6

As described above, in the present embodiment, the allowable current Imax (initial value) for the LED 141 is set from the current range B in which the light output is linearly changed with respect to the current in the previously acquired current-light output characteristic of the LED 141. Therefore, according to the present embodiment, the initial value of the allowable current Imax for the LED 141 can be maximized as much as possible within a range in which thermal runaway does not occur in the LED 141. That is, the performance of the LED 141 can be maximized.

In addition, in the present embodiment, the junction temperature Tjm of the LED 41 when the allowable current Imax is supplied is estimated based on a result of measuring a voltage of the LED 141 when DC power with the estimation current Ie is supplied after DC power with the allowable current Imax is supplied to the LED 141 for correction. When the estimated junction temperature Tjm exceeds the allowable junction temperature Tmax corresponding to the allowable current Imax, that is, when a state of the LED 141 to be corrected is changed and there is a fear that degradation or the like may occur, the allowable current Imax is corrected. Therefore, according to the present embodiment, it is possible to prevent thermal runaway from occurring in the LED 141 when degradation or the like occurs in the LED 141.

Therefore, according to the present embodiment, the utilization efficiency of the LED 141 can be improved over a long period of time.

In the above example, the acquisition unit 201 actually supplies DC power to the LED 141 in a prober 1, causes the LED 141 to emit light, and acquires the current-light output characteristic of the LED 141. Instead of this, before the LED 141 is incorporated into the prober 1, DC power may be supplied to the LED 141 outside the prober 1 to acquire the current-light output characteristic of the LED 141.

In addition, in the above example, the setting unit 202 sets the allowable current Imax based on the current-light output characteristic of the LED 141. Instead of this, the current-light output characteristic of the LED 141 may be displayed on a display unit of a user interface unit 18, and the allowable current Imax may be set based on an input of a user of the prober 1 who sees the displayed content.

In the above example, in each LED unit U, the number of representative LEDs 141, that is, the number of LEDs 141 provided with the voltage measurement circuit M is one but may be plural. When the plurality of representative LEDs 141 are provided, for example, for the LED unit U that is the correction target, based on an average value of results of measuring voltages of the representative LEDs 141 by the voltage measurement circuit M, the correction unit 203 estimates the junction temperature Tjm of the LED 141 when the allowable current Imax is supplied. As a result, it is possible to reduce a variation between the individual LEDs 141 when estimating the junction temperature Tjm or the like.

Furthermore, in the above example, the voltage measurement circuit M measures a voltage between an anode and a cathode of a single LED 141. The present disclosure is not limited thereto, and the voltage measurement circuit M may combine voltages between an anode and a cathode of an LED set in which a plurality of LEDs 141 are connected in series. In this case, for example, based on a value obtained by dividing a voltage measured by the voltage measurement circuit M by the number of the LEDs 141 constituting the LED set, the correction unit 203 estimates the junction temperature Tjm of the LED 141 when the allowable current Imax is supplied. Even in this case, it is possible to absorb a variation between the individual LEDs 141 when estimating the junction temperature Tjm or the like.

Furthermore, in the above example, the plurality of LEDs 141 are included in each LED unit U, but one LED 141 may be included.

In addition to a prober, a heating device according to the present disclosure can be applied to a system as long as the system adjusts a temperature of a heating target with light emitted from the LED 141.

It should be understood that the embodiments disclosed herein are illustrative and non-restrictive in every respect. The above embodiments may be omitted, substituted, or modified in various forms without departing from the scope of the appended claims and the gist thereof.

What is claimed is:
1. A heating device comprising:
    a heater which includes a light-emitting diode (LED) and heats a heating target with light emitted from the LED;
    an LED controller which controls power supplied to the LED and controls, when a temperature of the heating target is adjusted, the power supplied to the LED in a range in which a current thereof does not exceed a maximum allowable current;

a voltage measurement unit configured to measure a voltage of the LED; and a main controller including a processor and a program storage unit storing program thereon, the program when executed by the processor causes the processor to:

set the maximum allowable current in a current range in which light output is linearly changed with respect to a current in a previously acquired current-light output characteristic of the LED, wherein the current-light output characteristic represents a relationship between the current and the light output of the LED;

estimate a junction temperature of the LED when the maximum allowable current is supplied, based on respective voltages of the LED measured by the voltage measurement unit for respective estimation current supplied, wherein the estimation currents are different from each other and the estimation currents are supplied after the maximum allowable current for correction has been supplied to the LED; and correct the maximum allowable current when the estimated junction temperature exceeds an allowable junction temperature corresponding to the maximum allowable current.

2. The heating device of claim 1,
wherein the program when executed by the processor further causes the processor to:

supply the power to the LED to actually cause the LED to emit light and acquires the current-light output characteristic of the LED; and set the maximum allowable current based on the acquired current-light output characteristic of the LED.

3. The heating device of claim 1, wherein the program when executed by the processor further causes the processor to correct the maximum allowable current based on a difference between the allowable junction temperature and the estimated junction temperature of the LED.

4. The heating device of claim 2, wherein the program when executed by the processor further causes the processor to correct the maximum allowable current based on a difference between the allowable junction temperature and the estimated junction temperature of the LED.

5. A control method of a light-emitting diode (LED) for heating a heating target with light, the control method comprising:

a process of controlling power supplied to the LED in a range in which a current thereof does not exceed a maximum allowable current; and a process of correcting the allowable current, wherein:

the maximum allowable current is set in a current range in which light output is linearly changed with respect to a current in a previously acquired current-light output characteristic of the LED, the current-light output characteristic representing a relationship between the current and the light output of the LED; and the process of the correcting includes estimating a junction temperature of the LED when the maximum allowable current is supplied, based on respective voltages of the LED measured by the voltage measurement unit for respective estimation current supplied, wherein the estimation currents are different from each other and the estimation currents are supplied after the maximum allowable current for correction has been supplied to the LED, and correcting the maximum allowable current when the estimated junction temperature exceeds an allowable junction temperature corresponding to the maximum allowable current.

6. The control method of claim 5, further comprising:
a process of supplying the power to the LED to actually cause the LED to emit light and acquiring the current-light output characteristic of the LED; and a process of setting the maximum allowable current based on the acquired current-light output characteristic of the LED.

7. The control method of claim 5, wherein the maximum allowable current is corrected based on a difference between the allowable junction temperature and the estimated junction temperature of the LED.

8. The control method of claim 6, wherein the maximum allowable current is corrected based on a difference between the allowable junction temperature and the estimated junction temperature of the LED.

* * * * *